United States Patent
Brown et al.

(10) Patent No.: US 7,051,245 B2
(45) Date of Patent: May 23, 2006

(54) SYSTEM AND METHOD FOR HANDLING OUT-OF-ORDER DATA SUPPLIED BY A REAL-TIME FEED

(75) Inventors: Kevin Brown, San Rafael, CA (US); Michael John Elvery Spicer, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 10/307,071

(22) Filed: Nov. 30, 2002

(65) Prior Publication Data

US 2004/0107389 A1  Jun. 3, 2004

(51) Int. Cl.
*G06F 11/00* (2006.01)

(52) U.S. Cl. .................... 714/50; 707/7; 707/104.1; 370/394

(58) Field of Classification Search .................. 714/50; 707/201, 7, 104.1; 370/394
See application file for complete search history.

(56) References Cited

U.S. PATENT DOCUMENTS

| | | | | |
|---|---|---|---|---|
| 5,260,935 A | * | 11/1993 | Turner | 370/394 |
| 5,337,313 A | * | 8/1994 | Buchholz et al. | 370/394 |
| 5,410,546 A | | 4/1995 | Boyer et al. | 371/37.1 |
| 5,548,593 A | * | 8/1996 | Peschi | 370/394 |
| 5,588,000 A | * | 12/1996 | Rickard | 370/428 |
| 5,768,530 A | * | 6/1998 | Sandorfi | 709/233 |
| 6,006,326 A | | 12/1999 | Panwar et al. | 712/217 |
| 6,016,526 A | | 1/2000 | Arimilli et al. | 710/105 |
| 6,047,367 A | | 4/2000 | Heller, Jr. | 712/23 |
| 6,055,246 A | * | 4/2000 | Jones | 370/503 |
| 6,058,472 A | | 5/2000 | Panwar et al. | 712/218 |
| 6,101,186 A | * | 8/2000 | Craig | 370/394 |
| 6,327,625 B1 | * | 12/2001 | Wang et al. | 709/235 |
| 6,381,242 B1 | * | 4/2002 | Maher et al. | 370/394 |
| 6,415,378 B1 | | 7/2002 | Davidson et al. | 712/207 |
| 6,449,622 B1 | | 9/2002 | LaRue et al. | 707/201 |
| 6,738,379 B1 | * | 5/2004 | Balazinski et al. | 370/394 |

(Continued)

OTHER PUBLICATIONS

"Fast Sort of Ordered, or Partially Ordered. Data," IBM Technical Disclosure Bulletin vol. 32, No. 1, Jun. 1989.

(Continued)

*Primary Examiner*—Robert Beausoliel
*Assistant Examiner*—Philip Guyton
(74) *Attorney, Agent, or Firm*—Samuel A. Kassatly (57) ABSTRACT

A system and associate method handle out-of-order data supplied by a real-time feed, and ingests the real-time feed fast enough to keep up with the feed rate while storing the data in a database in a time-ordered or other sequential manner without discarding any data. The present system adds a second unordered list for out-of-order data received from the feed or from a replay feed. A data element received from the feed, which has a time stamp earlier than the last data element placed in the ordered list, is placed in the unordered list. If replay data is received, the replay data elements are placed in the unordered list without verifying the time stamp. The data is then flushed from these memory lists to a database. Both the ordered list and the unordered list are inputted into the database. The database handles the ordering and merging of these two lists on insertion. The ordered data is still available to the user for real-time query in memory while all data elements are available for analysis in the database.

24 Claims, 5 Drawing Sheets

U.S. PATENT DOCUMENTS

| | | | |
|---|---|---|---|
| 6,781,992 B1* | 8/2004 | Rana et al. | 370/394 |
| 2003/0012200 A1* | 1/2003 | Salamat | 370/394 |
| 2004/0100963 A1* | 5/2004 | Guo | 370/394 |

OTHER PUBLICATIONS

"Logical Sequencing of Notification," IBM Technical Disclosure Bulletin vol. 33, No. 7 Dec. 1990.

P. Caironi et al., "Context Reorder Buffer: An Architectural Support for Real-Time Interrupt Processing in RISC Superscalar CPU Architectures," Journal of Microelectronic Systems Integration, vol. 4, No. 4, 1996.

G. Bosilca et al., "OVM: Out-of-order execution parallel virtual machine," Future Generation Computer Systems 18 (2002) 525-537.

A. Ben Abdallah et al., "Dynamic Fast Issue (DFI) Mechanism for Dynamic Scheduled Processors," IEICE Trans. Fundamentals, vol. E83-A. No. 12, Dec. 2000.

* cited by examiner

SYSTEM AND METHOD FOR HANDLING OUT-OF-ORDER DATA SUPPLIED BY A REAL-TIME FEED

FIELD OF THE INVENTION

The present invention generally relates to processing of data streams in real-time. More specifically, this invention pertains to a method for extracting out-of-order data elements from the data stream, saving those data elements, and reinserting them in a database where the data elements can be placed in a sequential order.

BACKGROUND OF THE INVENTION

Time-based data from a real-time feed usually arrives in chronological order. One example of real-time feed of data would be financial trade information. User's software accepts the data in feed format, maintains it in memory for manipulation and queries from the user, then loads it into a database. The user expects to view the data on a time-ordered basis according to time of occurrence or time stamping. In addition, the viewer expects to have the data available to queries immediately after receiving the data stream.

Occasionally, however, an out-of-order data point may arrive. Out-of-order data may occur because a single data element comes out of place. Data may also arrive out-of-order if the data must be "replayed" from the data stream for some duration of time. The data "replay" might be required when the system is unable to handle the data as it was received, i.e. the data feed system is down.

The occurrence of an out-of-order data point is problematic when treating these feeds as ordered streams of data. Typically, the data is being received from the feed at such a high rate that inserting an out-of-order data element in the correct ordered position in the stream is not possible. In prior systems, any out-of-order point was discarded, i.e., not stored in the database. This presents the disadvantage of losing data. In addition, any attempt to insert the out-of-order point reduced the system's ability to respond to the data feed, slowing the system down. When the system slows down, data is lost because the system cannot keep up with the data feed. Either way, data is lost.

Current real-time loaders generally identify this problem and address it in a manner that would likely result in lost data and increased resource usage. These loaders discard out-of-order data elements. The incoming data stream is separated into entities; for example, each stock in a stream of stock trades is a separate entity. When data must be "replayed," duplicate entities with their own ordered lists are created, consuming additional memory resources. These separate "replay" entities still discard any out-of-order data elements. Attempts have been made to insert out-of-order data elements in the correct ordered positions but this requires too much processing resources, rendering it difficult to keep up with ingesting all the data sent in the feed.

What is therefore needed is a system for handling out-of-order data that neither discards data elements nor slows data stream processing. The need for such a system and associated method has heretofore remained unsatisfied.

SUMMARY OF THE INVENTION

The present invention satisfies this need and presents a system, a computer program product, and an associated method (collectively referred to herein as "the system" or "the present system") for handling out-of-order data supplied by a real-time feed.

It is one feature of the present system to process or ingest real-time feeds fast enough to keep up with the feed rate without discarding any data. The present system then inserts the data in a database allowing the database to sort the data in a time-ordered or other sequential manner.

The present system could be added to a database installed on a server. Each entity for which data is being collected from the feed has an ordered list of data elements received from the feed. The feed may be ordered based on time or any other sequential value.

For example, all trade information for two stocks, e.g., Company A and Company B is collected. One entity is created for Company A with a list of all Company A trades, and a separate entity is created for Company B with a list of all Company B trades. The present system adds a second unordered list for any out-of-order data received from the feed or "replayed".

Any data element received from the feed is placed in the unordered list if it has a time stamp earlier than the most recent data element placed in the ordered list. If "replay" data is received, all data elements in the "replay" are placed in the unordered list without verifying the time stamp. The data is then flushed from these memory lists to a database. Both the ordered list and unordered list are inserted into the database where they are stored and maintained. The database handles the ordering and merging of these two lists on insertion. The ordered data is still available to the user for real-time query in memory while all data elements are available for analysis in the database.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Data stream: A flow of data from one place to another.

Entity: A subset of a data stream that has a unique identity. As an example, in a data stream of stock prices, the stock price of a company would be an entity.

Feed: The data stream input to a computer program.

Thread: In computer programming, a thread is one part of a larger program that can be executed independent of the whole.

Figure 1:
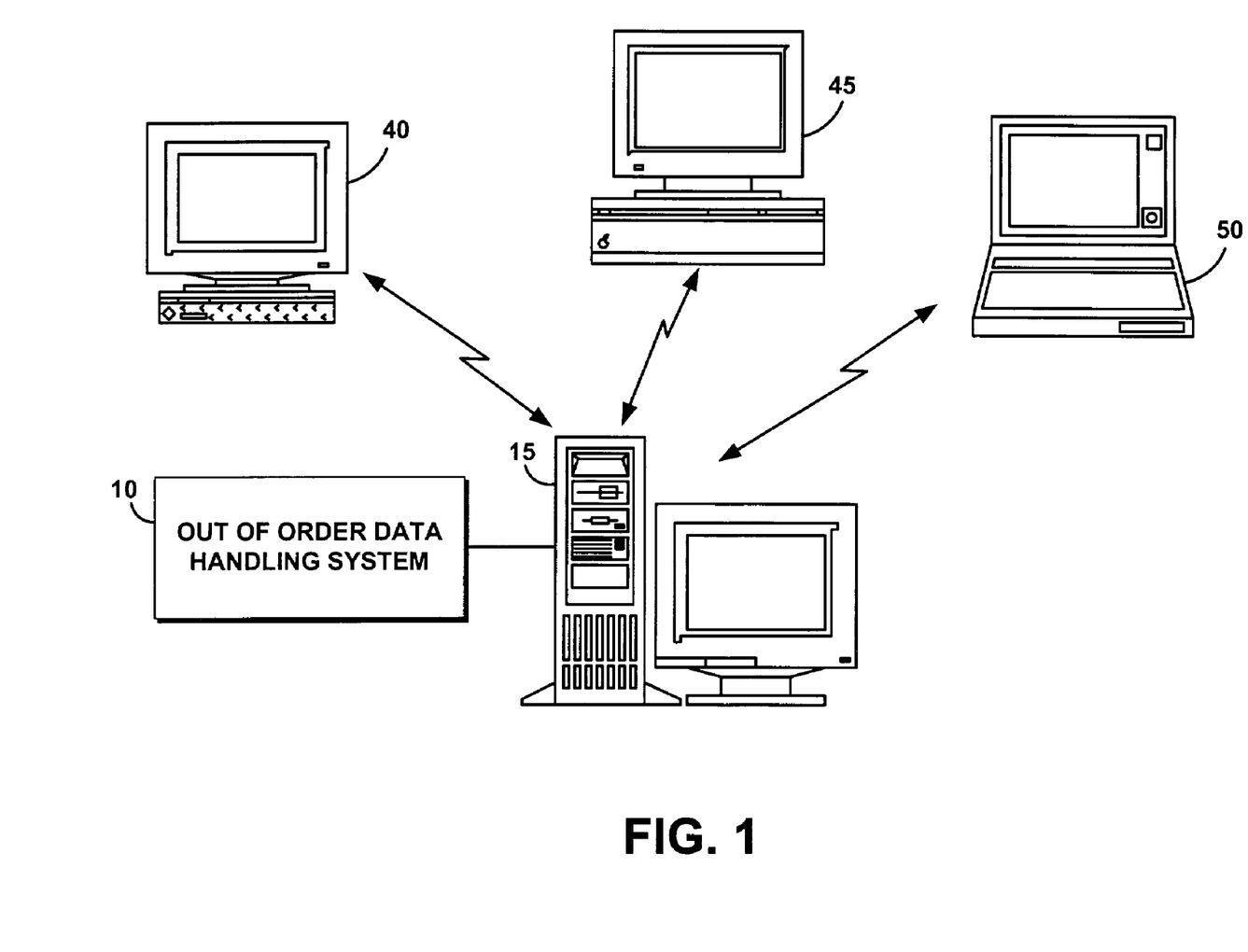
FIG. 1 is a schematic illustration of an exemplary operating environment in which an out-of-order data handling system of the present invention may be used.

FIG. 1 portrays an exemplary overall environment in which a system and associated method for handling out-of-order data supplied by a real-time feed according to the present invention may be used. The data handling system 10 (also referred to herein as out of order data handling system) includes a software programming code or computer program product that is typically embedded within, or installed on a host server 15. Alternatively, system 10 can be saved on a suitable storage medium such as a diskette, a CD, a hard drive, or like devices. While the system 10 will be described in connection with a stand-alone database of terms that may have been derived from the WWW and other sources, the system 10 can be also accessed by other systems through the WWW.

In FIG. 1 exemplary users are represented by a variety of computers such as computers 40, 45, 50, and can query the host server 15 for desired information. The host server 15 is connected to computers 40, 45, 50 via communications links such as a telephone, cable, or satellite link. Each of computers 40, 45, 50 includes a software that will allow the user to browse the Internet and interface securely with the host server 15. Each of computers 40, 45, 50 communicates with the host server 15 either through the WWW, a local area network, a wide area network, or other communications network among a group of computers.

Figure 2:
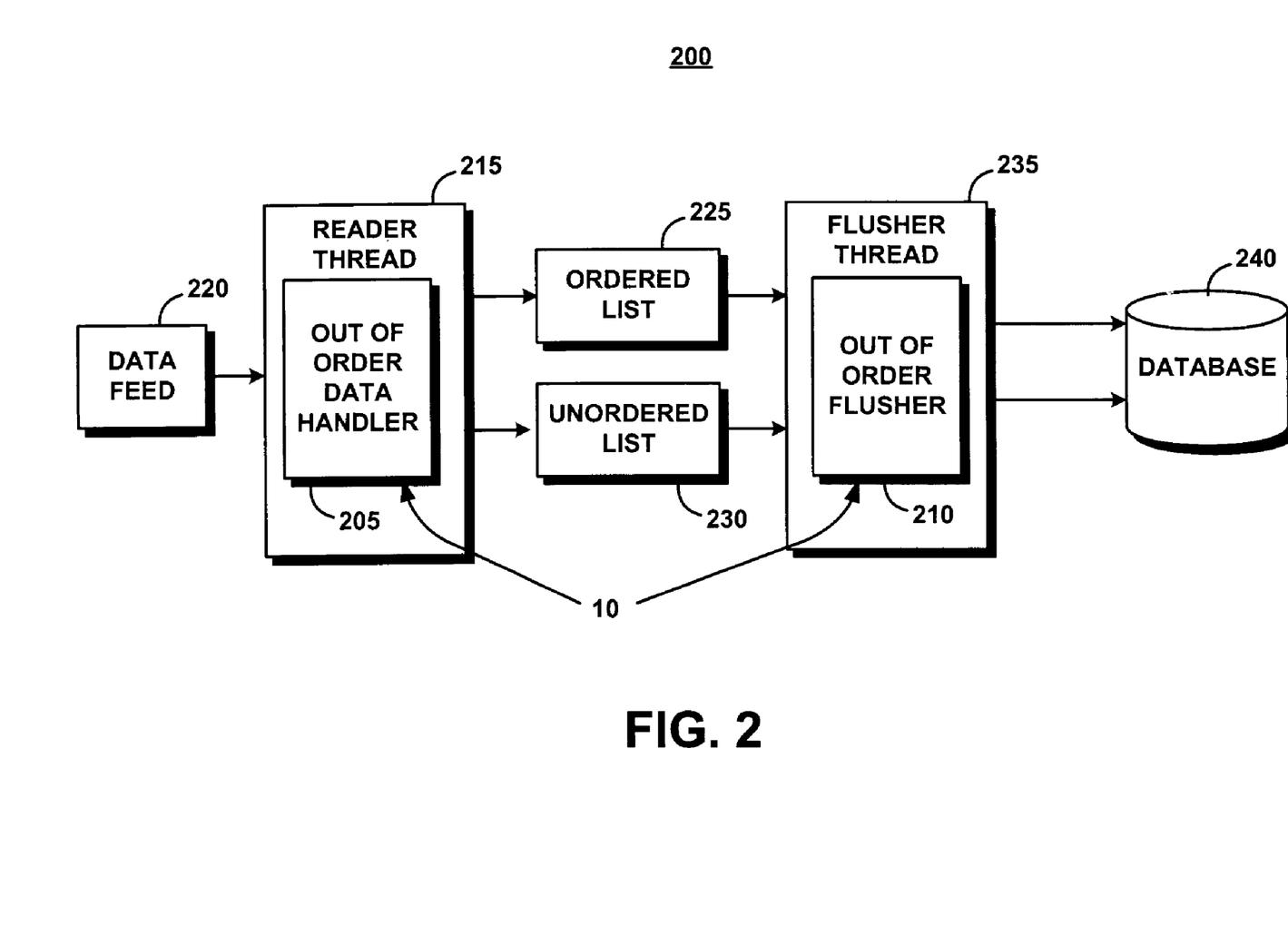
FIG. 2 is a block diagram of the high-level architecture of the out-of-order data handling system of FIG. 1.

FIG. 2 illustrates the high-level hierarchy of a real-time loader 200 in which system 10 may be implemented. System 10 is generally comprised of two modules: an out-of-order data handler 205 and an out-of-order flusher 210. The out-of-order data handler 205 is part of a reader thread 215 that reads an incoming data feed 220 then divides it into separate entities.

The out-of-order data handler 205 separates the incoming data feed 220 for each entity into an ordered list 225 and an unordered list 230 based on time stamping or other sequential value or values. The ordered list 225 is available for real-time queries by the user. The out-of-order flusher 210 resides in the flusher thread 235. The out-of-order flusher 210 inserts the ordered data from the ordered list 225 and the out-of-order data from the unordered list 230 into the database 240. The database 240 orders the data in time sequence.

Figure 3:
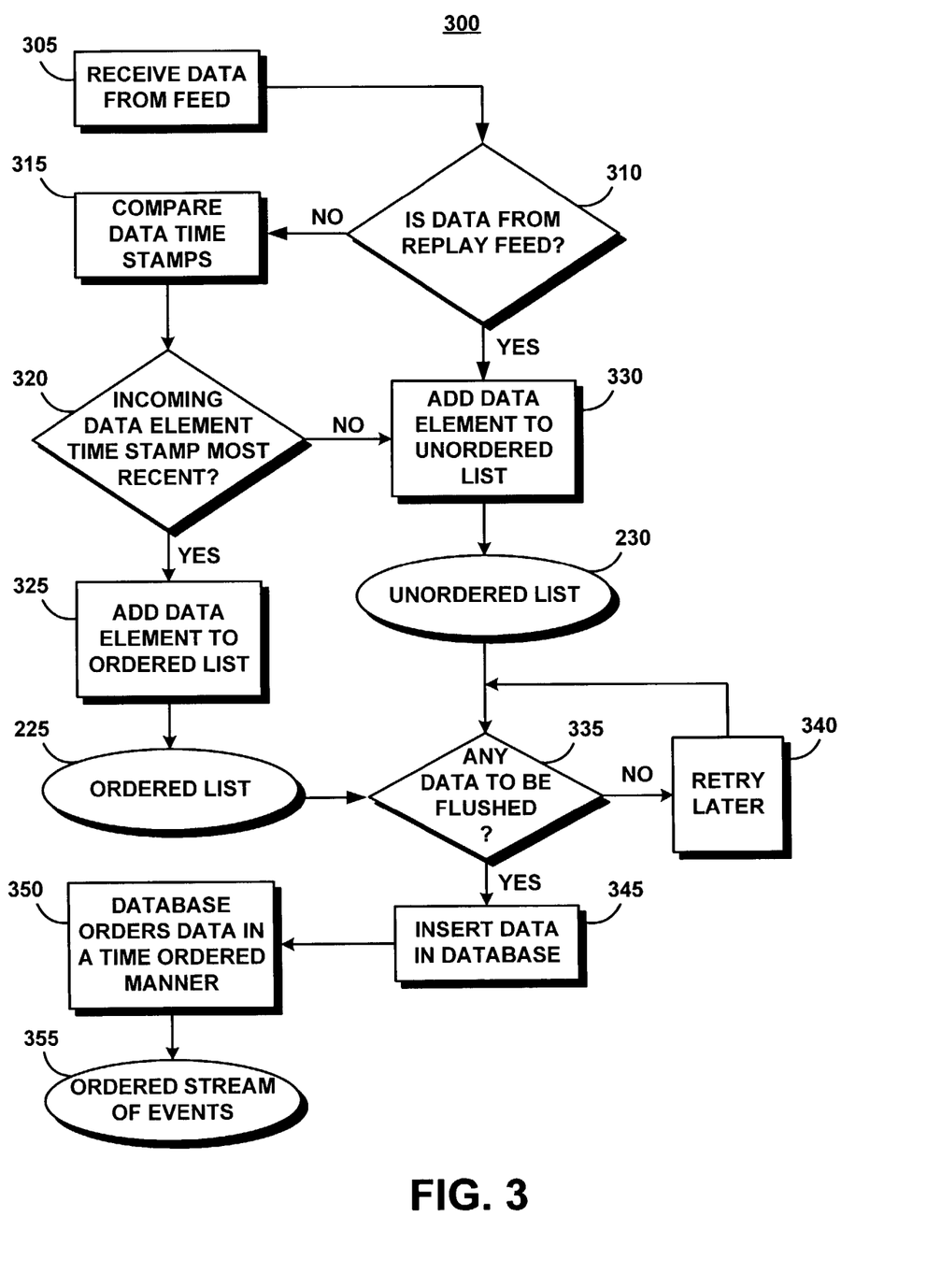
FIG. 3 is a process flow chart illustrating a method of operation of the out-of-order data handling system of FIGS. 1 and 2.

FIG. 3 illustrates a method of operation 300 of system 10. At block 305, the reader thread 215 receives data from the data feed 220. System 10 initially checks whether the incoming data element is from a replay stream at decision block 310. If not, system 10 proceeds to block 315, where, for each data element in the data stream, the out-of-order data handler 205 compares the time stamp (and/or another sequential element) for that data element with the time stamp for the last received data element in the ordered list 225.

If at decision block 320 the time stamp for the new data element is more recent than the most recent data element in the ordered list 225, system 10 proceeds to block 325. The out-of-order data handler 205 then adds the new data element to the ordered list 225. If, however, it is determined at decision block 320 that the time stamp for the new data is less recent than the most recent element in the ordered list 225, system 10 proceeds to block 330. The out-of-order data handler 205 then adds the new data element to the unordered list 230.

Returning to decision block 310, if the data element is from a replay stream, system 10 adds the data element to the unordered list 230 at block 330. A replay stream is essentially a "replay" of a data feed that could not be processed in real time. This may be because the system was not running at the time or for any other reason. A replay stream is "played back" as a separate feed, and the feed configuration for that feed identifies it as being a replay feed. This allows all data elements from that feed to be placed directly on to the unordered list 230 (block 330).

At decision block 335, the real-time loader 200 periodically checks the ordered list 225 and the unordered list 230, and determines if there is any data to be flushed. The real-time loader 200 flushes data from the ordered list 225 and the unordered list 230 to the database 240. The flushing period is the time interval between flushes, and is a parameter that is set or programmed by the user.

Data is not removed from the memory of the flusher thread 235 by flushing, so this data can still be accessed by the user in real time. Data from the memory is used for user queries when available, rather than data from the database 240.

If method 300 determines at decision step 335 that there is no data to flush, system 10 proceeds to block 340 and waits for the prescribed time interval before retrying a data flush.

The user sets memory high- and low-watermarks in the real-time loader 200 to keep memory from becoming full. When the high-watermark is reached, the real-time loader 200 deletes data that has already been flushed to the disk until the low-watermark is reached.

If however, method 300 determines at decision block 335 that certain data, whether ordered or unordered, needs to be flushed, the out-of-order flusher 210 inserts both the ordered data and out-of-order data into the database 240 at block 345. At block 350 database 240 orders the data in a time ordered manner (e.g., according to a time sequence) or another desired sequential manner, creating an ordered stream of events 355.

Figure 4A:
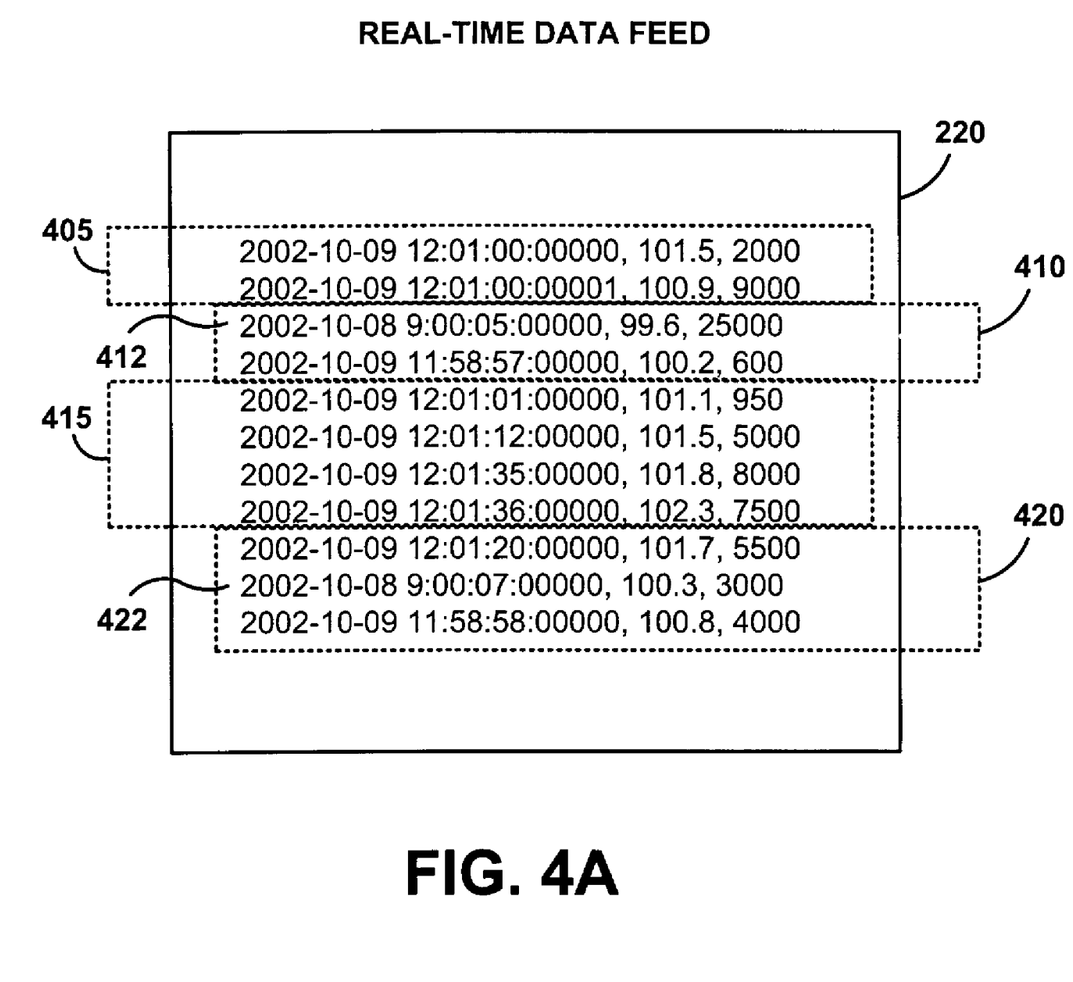
FIGS. 4A and 4B represent an example that illustrates the method of operation of the out-of-order data handling system of FIGS. 1 and 2.
Figure 4B:
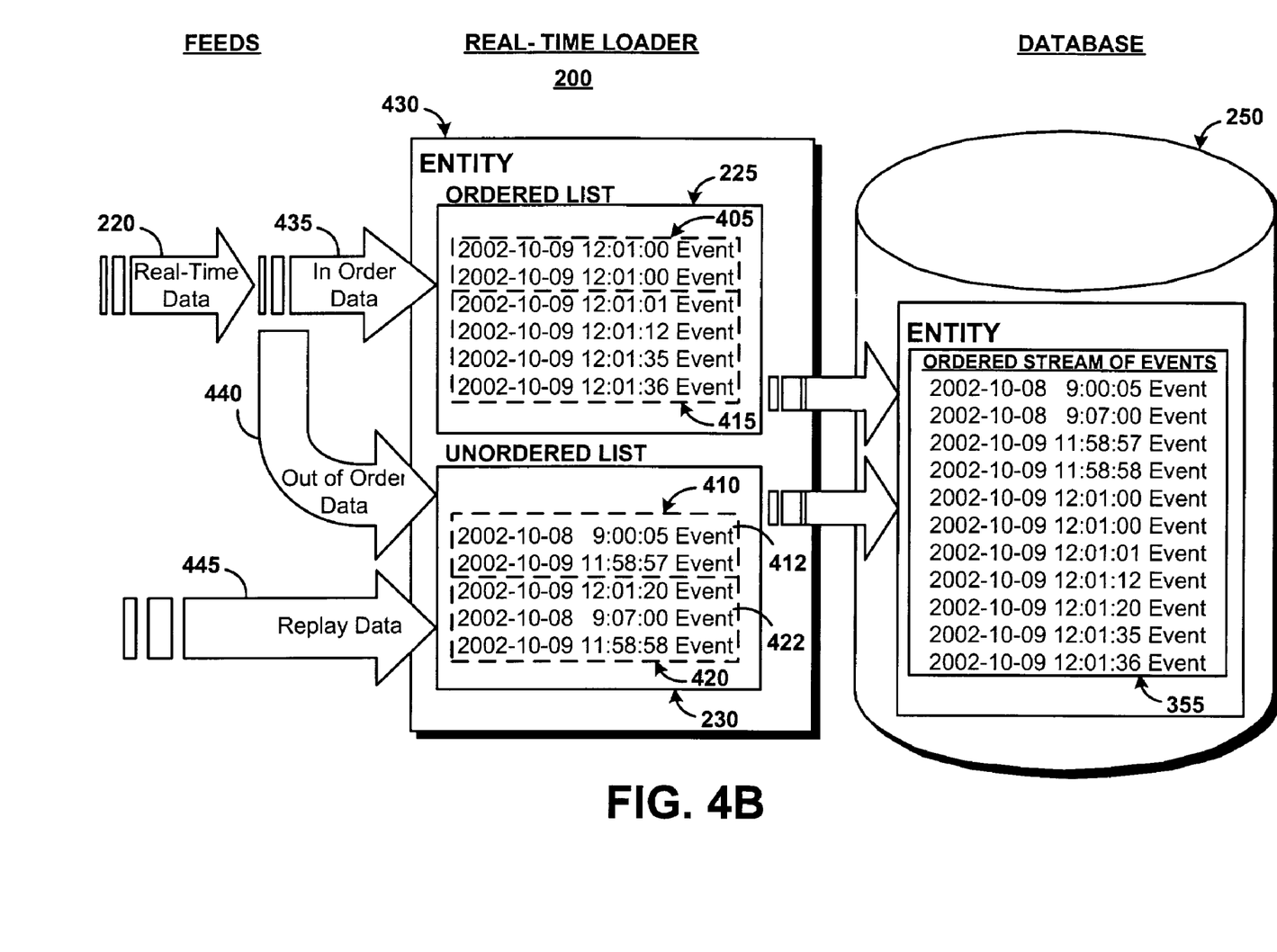

With further reference to FIGS. 4A and 4B, the example shown therein illustrates the performance of system 10 within the real-time loader 200. An exemplary real-time data feed is shown in FIG. 4A. Each line in the feed represents a data element comprising date, time, stock price, and number of shares traded. Two data elements are shown in group 405, two in group 410, four in group 415, and three in group 420.

In the present example, the data for the single entity (e.g., IBM stock) is inputted from 2 feeds, a first feed is "replaying" events associated with the 2002-10-08 time stamp, and the second feed is receiving the real-time feed associated with the 2002-10-09 time stamp.

The real-time loader 200, including system 10, separates the data stream, one data element at a time, into either the ordered list 225 or the unordered list 230 in entity 410. There are initially no data elements in the ordered list 225 for comparison. Consequently, the first data element in group 405 is routed through in-order data stream 435 to the ordered list 225, as explained earlier. The next data element in group 405 is compared to the first data element of group 405 by the out-of-order data handler 205 (block 315 of FIG. 3. This data element occurs after the first data element, so it is routed to the ordered list 225 (block 325 of FIG. 3).

The first data element 412 in group 410 is determined to originate from the replay stream 445, and thus it is routed to the unordered list 230 (block 330), through out-of-order data stream 440.

The second data element in group 410 is compared to the last data element of group 405. Even though the second data element in group 410 occurs after the first data element in group 410, it also occurs before the last data element of group 405, and thus it is routed to the unordered list 230 (block 330).

The first data element of group 415 is compared to the most recent data element in the ordered list 225, which is the last data element of group 405. The first data element of group 415 occurs after the most recent data element in the ordered list 225 so is added to the ordered list 225. This process is repeated for the next three data elements in 415, wherein each data element is compared to the most recent data element in the ordered list 225, and all are added to the ordered list 225.

The first data element in group 420 is compared to the most recent data element in the ordered list 225 which is now the last data element in group 415. The first data element of group 420 occurs before the last data element in group 415, so the out-of-order data handler 205 places the first data element of group 420 in the unordered list 230.

The second data element 422 in group 420 is determined to originate from the replay stream 445, and thus it is routed to the unordered list 230 (block 330). The third data element in group 420 occurs before the last data element in the ordered list 225, and so are placed in the unordered list 230.

The real-time loader system 200 finds that data in both the ordered list 225 and unordered list 230 are ready to be flushed (block 335). The out-of-order flusher inserts both the ordered list 225 and unordered list 230 in database 240 (block 345). The database 240 orders the data with respect to the time and date stamp (block 350) producing the ordered stream of events 355.

On occasion the data stream is interrupted. In this case, the real-time loader 200 saves the data in a replay data stream 445. In a fashion similar to that described in the flow chart and example above, system 10 places the replay data stream 445 directly into the unordered list 230 until a data element is found that occurs after the most recent data element in the ordered list 225. The data in the replay stream is then treated as any other out-of-order data. The replay feed is sent directly to the unordered list 230, and is not written to the ordered list 225.

It is to be understood that the specific embodiments of the invention that have been described are merely illustrative of certain application of the principle of the present invention. Numerous modifications may be made to the system and method for handling out-of-order data supplied by a real-time feed invention described herein without departing from the spirit and scope of the present invention.

What is claimed is:

1. A method for handling out-of-sequence data supplied by a real-time feed, comprising:
   receiving data on a real-time basis;
   checking if the data is out-of-sequence based on time stamps associated with the data;
   wherein the data includes a plurality of entries having the same time stamp;
   if the data contains out-of-sequence data, inserting the out-of-sequence data in an unordered list;
   if the data contains in-sequence data, inserting the in-sequence data in an ordered list;
   flushing the in-sequence data to a database;
   checking the unordered list for unflushed data;
   if the unflushed data is found in the unordered list, flushing the unflushed data to the database;
   ordering the in-sequence data and the out-of-sequence data that have been flushed to the database, in a predetermined sequence based on time stamps associated with the data;
   making the in-sequence data available for real-time query prior to flushing to the database; and
   making the flushed data in the database available for processing.

2. The method of claim 1, further comprising checking if the data contains replay data from a replay stream.

3. The method of claim 2, wherein if the data contains replay data, inserting the replay data in the unordered list.

4. The method of claim 1, further comprising periodically checking the ordered list and the unordered list for the unflushed data.

5. The method of claim 1, further comprising if the unflushed data is not found, rechecking the ordered list and the unordered list at a later time.

6. The method of claim 3, wherein ordering the data that has been flushed to the database in a predetermined sequence comprises flushing the flushed data in a time ordered manner.

7. The method of claim 6, wherein checking if the data is out-of-sequence further comprises comparing time stamps of sequential data elements in the real-time feed.

8. The method of claim 7, further comprising if the data contains replay data, inserting the replay data in the unordered list.

9. A computer program product having instruction codes stored on a computer-useable medium, for handling out-of-sequence data supplied by a real-time feed, comprising:
   a first set of instruction codes for checking if data received on a real-time basis is out-of-sequence based on time stamps associated with the data;
   wherein the data includes a plurality of entries having the same time stamp;
   if the data contains out-of-sequence data, the first set of instruction codes inserts the out-of-sequence data in an unordered list;
   if the data contains in-sequence data, the first set of instruction codes inserts the in-sequence data in an ordered list and flushing the in-sequence data to a database;
   a second set of instruction codes for checking the unordered list for unflushed data;
   if the unflushed data is found in the unordered list, the second set of instruction codes flushes the unflushed data to the database, and orders the in-sequence data and the out-of-sequence data that have been flushed to the database, in a predetermined sequence based on time stamps associated with the data;
   wherein the in-sequence data is available for real-time query prior to flushing to the database; and
   wherein the flushed data in the database is available for processing.

10. The computer program product of claim 9, further comprising a third set of instruction codes for checking if the data contains replay data from a replay stream.

11. The computer program product of claim 10, wherein if the data contains replay data, the third set of instruction codes inserts the replay data in the unordered list.

12. The computer program product of claim 9, wherein the second set of instruction codes further periodically checks the ordered list and the unordered list for the unflushed data.

13. The computer program product of claim 9, wherein if the unflushed data is not found, the first set of instruction codes rechecks the ordered list and the unordered list at a later time.

14. The computer program product of claim 11, wherein the database orders the data that has been flushed to the database in a time ordered manner.

15. The computer program product of claim 14, wherein the first set of instruction codes further compares time stamps of sequential data elements in the real-time feed.

16. The computer program product of claim 15, further comprising a third set of instruction codes that checks if the data contains replay data from a replay stream, and if the data contains replay data, the third set of instruction codes inserts the replay data in the unordered list.

17. A system having-instruction codes for handling out-of-sequence data supplied by a real-time feed, comprising:
 means for checking if data received on a real-time basis is out-of-sequence based on time stamps associated with the data;
 wherein the data includes a plurality of entries having the same time stamp;
 if the data contains out-of-sequence data, the checking means inserts the out-of-sequence data in an unordered list;
 if the data contains in-sequence data, the checking means inserts the in-sequence data in an ordered list;
 flushing means for flushing the in-sequence data to a database, and for checking the unordered list for unflushed data to the database;
 if the unflushed data is found in the unordered list, the flushing means flushes the unflushed data to the database, and orders the in-sequence data and the out-of-sequence data that have been flushed to the database, in a predetermined sequence based on time stamps associated with the data;
 wherein the in-sequence data is available for real-time query prior to flushing to the database; and
 wherein the flushed data in the database is available for processing.

18. The system of claim 17, further comprising a replay means for checking if the data contains replay data from a replay stream.

19. The system of claim 18, wherein if the data contains replay data, the replay means inserts the replay data in the unordered list.

20. The system of claim 17, wherein the flushing means further periodically checks the ordered list and the unordered list for the unflushed data.

21. The system of claim 17, wherein if the unflushed data is not found, the checking means rechecks the ordered list and the unordered list at a later time.

22. The system of claim 19, wherein the database orders the data that has been flushed to the database in a time ordered manner.

23. The system of claim 22, wherein the checking means further compares time stamps of sequential data elements in the real-time feed.

24. The system of claim 23, further comprising a replay means for checking if the data contains replay data from a replay stream, and if the data contains replay data, the replay means inserts the replay data in the unordered list.

* * * * *